United States Patent [19]

Baranescu

[11] Patent Number: 4,831,982
[45] Date of Patent: May 23, 1989

[54] INTERNAL COMBUSTION ENGINE WITH BROAD FUEL TOLERANCE

[76] Inventor: George S. Baranescu, 5316 Howard Ave., Western Springs, Ill. 60558

[21] Appl. No.: 94,272

[22] Filed: Sep. 8, 1987

[51] Int. Cl.$^4$ .............................................. F02B 19/10
[52] U.S. Cl. ................................... 123/275; 123/300; 123/447
[58] Field of Search ............... 123/275, 447, 256, 276, 123/300, 299, 557

[56] References Cited

U.S. PATENT DOCUMENTS

| | | | |
|---|---|---|---|
| 2,126,442 | 8/1938 | Baud | 123/275 |
| 2,914,043 | 11/1959 | Nallinger | 123/275 |
| 4,091,771 | 5/1978 | Rapp et al. | 123/275 |
| 4,239,023 | 12/1980 | Simko | 123/275 |
| 4,665,881 | 5/1987 | Wade | 123/557 |

FOREIGN PATENT DOCUMENTS

2922683 12/1980 Fed. Rep. of Germany ...... 123/275

Primary Examiner—Andrew M. Dolinar

[57] ABSTRACT

An internal combustion engine having at least one cylinder, each cylinder including an open chamber permanently connected with a separate chamber. A small portion of the fuel charge is injected in the separate chamber, where it vaporizes, mixes with air, the fuel-air mixture being electrically ignited. The remaining portion of the fuel charge is injected in the open chamber into the burning gases ejected from the separate chamber. Both fuel injections are achieved by the same injection pump. The fuel charge of the separate chamber is accumulated in the injector of this chamber during the fuel injection in the open chamber, and is injected in the separate chamber during the next cycle.

31 Claims, 5 Drawing Sheets

INTERNAL COMBUSTION ENGINE WITH BROAD FUEL TOLERANCE

The invention relates to an internal combustion engine having the capacity to operate with a broad variety of fuels using one fuel at a time.

Several methods have been proposed for achieving fuel tolerance of internal combustion engines using one fuel at a time. These methods, which mostly refer to diesel engines, use spark assistance, ignition on a hot surface, the increase of air temperature at the time of fuel injection, and ignition by a flame jet. The engines operating according to these methods are either not practical or do not achieve a large fuel tolerance.

The object of the invention as described and claimed further is to provide an internal combustion engine of simple design, which can operate with a broad range of fuels. Each cylinder of the engine includes an open chamber permanently connected with a separate chamber called ignition chamber. The fuel charge of each cycle is divided in two portions of different amount. The small portion of the fuel charge is injected into the ignition chamber, where it vaporizes and mixes with air flowing from open chamber during the compression stroke. This fuel-air mixture is electrically ignited. The remaining portion of the fuel charge is injected by the injection pump in the open chamber into the burning gases ejected from the ignition chamber. Both fuel injections are achieved by the same injection pump. The fuel charge of the ignition chamber is accumulated in the injector of this chamber during the fuel injection into open chamber, and is injected in the ignition chamber in the next cycle by fuel expansion. The injection timing and the amount of fuel injected into ignition chamber are controlled by valves. The injection timing and the amount of fuel injected into open chamber are controlled by the injection pump.

The manner in which the invention is carried into practice, the methods of operation, and further objects and advantages of the invention are set forth in the following specification, wherein the invention is described in further detail by reference to the accompanying drawing.

Figure 1:
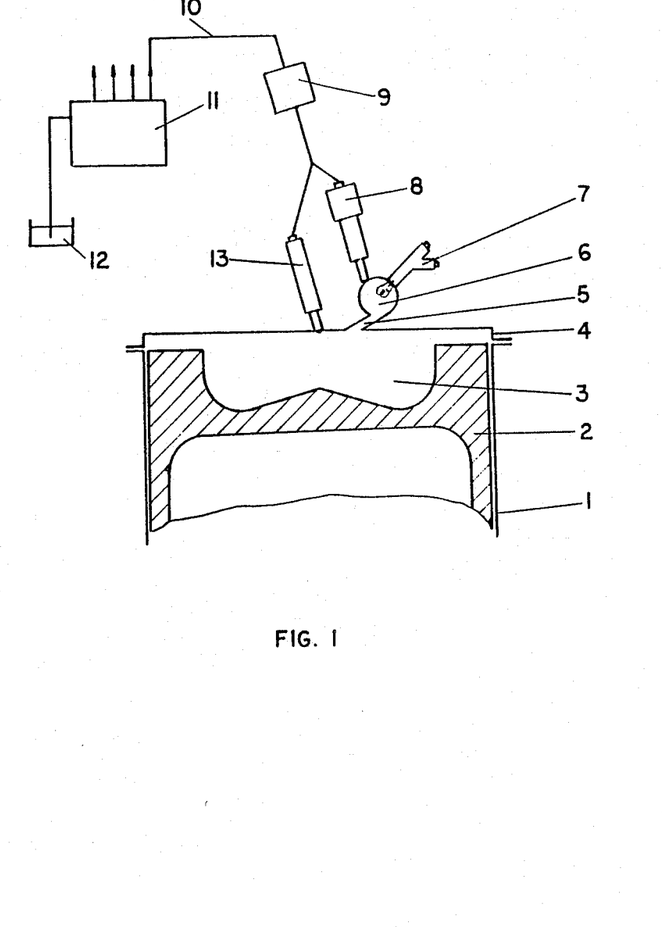
FIG. 1 shows in a schematic way the general configuration of the engine.

The general configuration of the engine is shown in FIG. 1 where only one cylinder have been represented. The engine includes cylinder 1, piston 2 wherein as an example the open combustion chamber 3 is located, cylinder head 4 provided with a conventional injector 13, and ignition chamber 6 connected with open chamber 3 via channel 5. As an example the ignition chamber represented in FIG. 1 is of swirl type; any other type of combustion chamber, which satisfies the requirements of the engine according to the invention can be used. The ignition chamber 6 includes the injector 8 of a new design, and the dual plug 7 which can operate as a spark plug as well as a glow plug. The dual plug is connected to a spark ignition system, as well as to a source of electricity for the operation as a glow plug. These connections are not represented in FIG. 1. Instead of the dual plug a conventional spark plug and a conventional glow plug can be used if the size of the ignition chamber allows the location of these parts. The injectors 8 and 13 are connected to the injection pump 11 by the same high pressure line 10 provided with heater 9. The injection pump 11 is connected to the fuel tank 12. The other usual components of the engine are not represented in FIG. 1.

Figure 2:
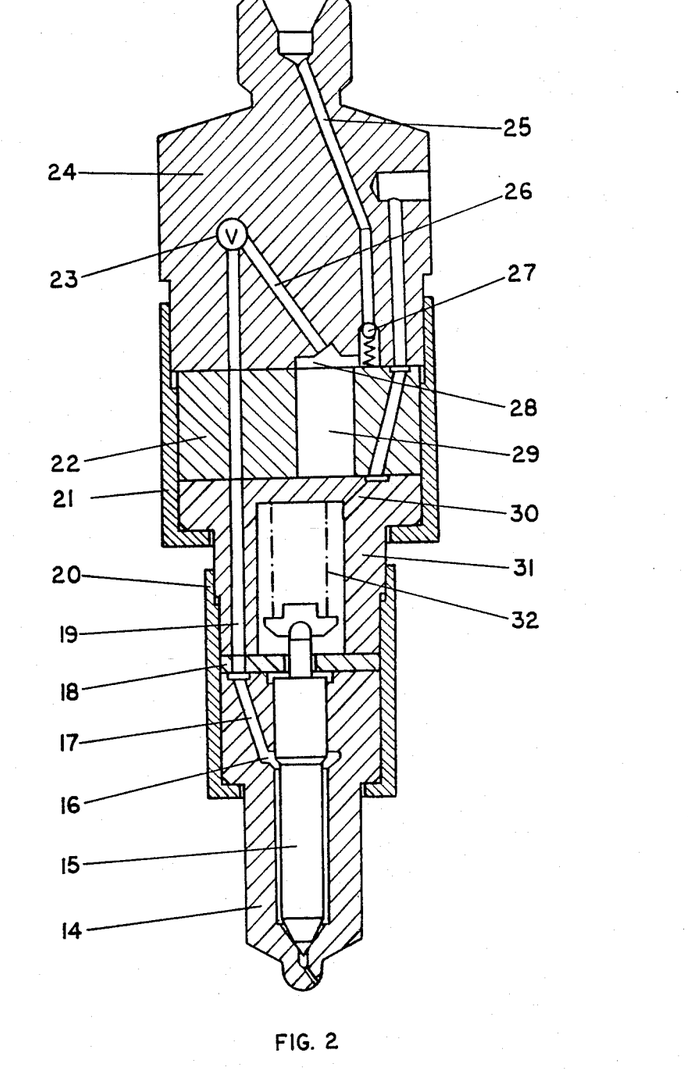
FIG. 2 represents an embodiment of the injector of the ignition chamber including a 2-way electromagnetic valve located on the connection between the accumulator and the nozzle.

One embodiment of the injector 8 is represented in FIG. 2. The injector is provided with a conventional nozzle, which includes the body 14, and nozzle needle 15 actuated by spring 32 located in housing 31. The nozzle needle lift is limited by the disc 18. The injector includes the accumulator 29 located in barrel 22. The accumulator is connected with high pressure channel 25 via channel 28 and one-way check valve 27, as well as with the chamber 16 of the nozzle 14 via channel 26, 2-way electromagnetic valve 23, and channels 19 and 17. The fuel leakage between nozzle needle 15 and nozzle body 14 are collected in the room of spring 32 and drained through channel 30. The nozzle body 14, disk 18, and housing 31 are assembled by the retaining nut 20, and barrel 22 is assembled with housing 31 and upper part 24 by the retaining nut 21.

The engine operates as follows. Before the start of injection in the ignition chamber 6 the fuel pressure in the accumulator 29 and channel 26 is higher than the opening pressure of nozzle needle 15. The electromagnetic valve 23 is closed, and the fuel pressure downstream from this valve is lower but near the closing pressure of nozzle needle 15.

When the injection in the ignition chamber 6 (FIG. 1) shall start, the electromagnetic valve 23 is opened. The accumulator 29 discharges into channel 19, the fuel pressure in nozzle chamber 16 increases, the nozzle needle 15 opens, and the injection in the ignition chamber starts. This injection ends when the pressure in the accumulator 29, in channels 26, 19 and 17, and in nozzle chamber 16 decreases just under the closing pressure of the nozzle needle 15.

To achieve the fuel injection into the ignition chamber as described above, the amount of fuel which flows from the accumulator shall increase the pressure downstream from the accumulator at least up to the opening pressure of the nozzle needle 15. Therefore the accumulator shall be large enough to satisfy this condition, even for the operating regime wherein the pressure in the accumulator is the lowest.

The timing of the injection into the ignition chamber 6 can be modified in large limits because the electromagnetic valve 23 can be opened at any time between the closing of the exhaust valve and late compression stroke.

Whichever is the timing of the fuel injection into the ignition chamber 6 the gases in which the fuel is injected have high temperature because (1) the walls of the ignition chamber 6 are hot, and (2) the temperature of the residual combustion gases is high. If necessary, the ignition chamber can be low cooled or insulated.

The possibility to inject the fuel charge of the ignition chamber as early as necessary, the fine atomization of the fuel achieved by high pressure injection, and the high temperature in the ignition chamber, ensures a fast and advanced vaporization of the fuel whichever the fuel volatility and viscosity may be.

The fuel charge of the ignition chamber 6 mixes with the air coming from the open chamber 3 during compression stroke. A near homogeneous fuel-air mixture is achieved due to the turbulent flow.

At a selected moment this mixture is spark ignited. A combustion of flame propagation type occurs in the ignition chamber, because of near homogeneous fuel-air mixture. Due to combustion progression, the pressure in the ignition chamber 6 increases. Therefore burning gases are ejected into open chamber 3. The fuel charge of open chamber 3 is injected into the incoming burning gases by the injector 13 (FIG. 1). A fast ignition and a smooth combustion occurs in the open chamber whichever is the self-ignition property of the used fuel because (1) the incoming burning gases have considerably increased the air motion in open chamber, which accelerates the mixing between fuel and air; (2) the radiation and the high temperature of the incoming burning gases produce a fast vaporization of the injected fuel; (3) the incoming burning gases have high concentration of reactive particles, which accelerate and even shorten the chain reactions on which the ignition and combustion of the respective fuel proceed.

The accumulation of the fuel necessary to achieve the fuel injection into the ignition chamber in the next cycle occurs during the injection of the fuel charge of open chamber 3. Because the high pressure channel 25 (FIG. 2) is in open connection with high pressure line 10 (FIG. 1), the fuel pressure in channel 25 increases when the injection pump delivers fuel into high pressure line 10. When the fuel pressure in channel 25 becomes higher than the residual pressure in accumulator 29 the one-way check valve 27 opens and fuel from channel 25 flows into accumulator 29 via channel 28. After the fuel pressure in line 10 has reached the maximum for the respective cycle of the engine, the fuel pressure in channel 25 decreases, the one-way check valve 27 closes, and therefore the accumulation of the fuel ends.

The electromagnetic valve 23 shall be closed before the fuel pressure in accumulator 29 becomes equal to the opening pressure of the nozzle 14, for avoiding a second fuel injection into ignition chamber 6 during the same engine cycle. If the characteristics of the fuels used by the engine allow the early delivery of the fuel charge of ignition chamber, a relatively slow acting electromagnetic valve can be used. But if the range of fuels used by the engine includes high volatile low knock resistance fuels, a fast acting electromagnetic valve is necessary because such fuels shall be injected during mid or late compression stroke for avoiding uncontrolled combustion in the ignition chamber. Consequently the period of time from the opening of the electromagnetic valve 23 to the moment when the fuel pressure in the accumulator 29 becomes equal to the opening pressure of the nozzle 14 is short especially at high speed.

Figure 3:
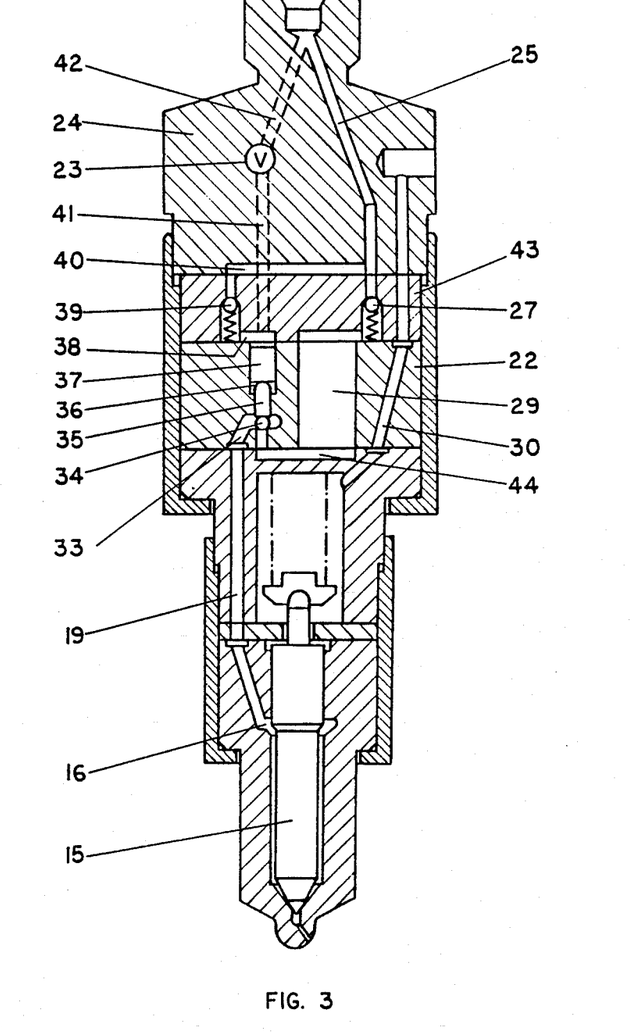
FIG. 3 represents an embodiment of the injector of the ignition chamber wherein the connection between the accumulator and the nozzle is opened and closed by a discharge valve whose operation is controlled by a 2-way electromagnetic valve.

A certain extension of the period of time available for the closing of the connection between the accumulator 29 and nozzle 14 can be obtained by using a hydraulically actuated and electrically controlled valve 34, located on the connection between the accumulator and the nozzle as shown in FIG. 3.

The accumulator discharge valve 34 is connected to accumulator 29 via channel 44, and to channel 19 via channel 33. This valve can be of any type. As an example a ball type valve was considered in FIG. 3. The accumulator discharge valve 34 includes the stem 35 in contact with piston 37 whose diameter is larger than that of stem 35. The chamber above piston 37 is connected to high pressure channel 25 via channel 38, one-way check valve 39, and channel 40, as well as via channel 38, control channel 41, electromagnetic valve 23, and channel 42. As an example the one-way check valves 27 and 39 are located in the additional barrel 43; these valves can be also located in the upper part 24. The fuel leakage between barrel 22, stem 35 and piston 37 are collected in chamber 36, and drained through a channel which is not represented in FIG. 3.

The accumulator discharge valve 34 operates as follows. Before the start of injection into ignition chamber 6 (FIG. 1) the electromagnetic valve 23 is closed. The fuel pressure in control channel 41 is lower than the fuel pressure in the accumulator 29 but high enough to maintain the accumulator discharge valve 34 closed against the forces generated on stem 35 by the fuel pressure in channels 33 and 44. The fuel pressure in high pressure channel 25 is the residual pressure in high pressure line 10 (FIG. 1), which is lower than the fuel pressure in control channel 41.

When the fuel injection in the ignition chamber 6 (FIG. 1) shall start the electromagnetic valve 23 is opened. The control channel 41 discharges into high pressure channel 25 via channel 42, the fuel pressure above piston 37 drops, valve 34 opens, the accumulator 29 discharges towards nozzle chamber 16, nozzle needle 15 opens, and the injection of the fuel charge of ignition chamber 6 occurs. This injection ends when the fuel pressure downstream the accumulator 29 drops under the closing pressure of the nozzle needle 15. At the end of the injection, the fuel pressure in the accumulator 29 and in the volume downstream from the accumulator is lower but near the closing pressure of the nozzle needle 15.

When the injection pump 11 starts to deliver fuel into high pressure line 10 (FIG. 1), the fuel pressure in high pressure channel 25 increases. A fuel flow occurs from this channel into the chamber above piston 37 via channels 42, 41 and 38, because at that time the electromagnetic valve 23 is opened. Fuel also flows into channel 38 via channel 40 and one-way check valve 39. The force acting on accumulator discharge valve 34 in the sense of valve closing increases. When the fuel pressure above piston 37 reaches a certain value, the accumulator discharge valve 34 is closed. The closing pressure is lower than the residual pressure in the accumulator 29 because the diameter of piston 37 is larger than that of stem 35. Therefore valve 34 is closed before the start of fuel penetration into accumulator 29. The fuel flow into chamber above piston 37 through channel 41 and one-way check valve 39, as well as through channel 41, and the discharge of the chamber only through channel 41, ensures a fuel flow in this chamber, which prevents the fuel overheating.

Due to the further increase of fuel pressure in high pressure channel 25 the one-way check valve 27 opens and fuel from channel 25 flows into accumulator 29. After the fuel pressure into high pressure channel 25 has reached the maximum for the respective cycle of the engine, the fuel pressure in this channel decreases, the one-way check valve 27 closes, and the fuel accumulation ends. Because the electromagnetic valve 23 is still open, a portion of the fuel existing in the volume above piston 37 discharges into high pressure channel 25 via channels 41 and 42, until the electromagnetic valve 23 is closed. Due to this discharge the fuel pressure in control channel 41 is lower than in the accumulator 29, and remains so until the next engine cycle as previously shown.

The electromagnetic valve 23 shall be closed at or before the moment when the fuel pressure above piston 37 had decreased to the minimum pressure which still maintains valve 34 closed. The larger the diameter of piston 37, the later the closing of the electromagnetic valve 23 can be. Thus, the injector of FIG. 3 allows the closing of the electromagnetic valve 23 in a longer period of time than the injector of FIG. 2.

The fuel charge of ignition chamber 6 (FIG. 1) delivered by the injectors of FIGS. 2 and 3 increases with load and speed, because this fuel charge depends on the maximum pressure in high pressure channel 25, which increases with load and speed.

For some applications, the fuel charge of ignition chamber 6 delivered by the injectors of FIGS. 2 and 3 may be too large at high load and/or speed. To prevent this situation a control of the amount of fuel charge of ignition chamber shall be provided. Such control can be achieved in several ways: (1) by limiting the amount of fuel which flows into accumulator 29; (2) by draining a portion of the accumulated fuel before the start of injection into the ignition chamber 6; (3) by allowing only a partial discharge of the accumulator 29 towards the nozzle 14.

The limitation of the amount of fuel which flows into accumulator 29 can be achieved by providing a control on high pressure channel 25 (FIGS. 2,3). As an example a 2-way electromagnetic valve located on this channel can be used. This valve is opened before the injection pump 11 starts to deliver fuel into line 10 (FIG. 1). When the selected amount of fuel has flown into accumulator 29, the electromagnetic valve is closed. A slow acting electromagnetic valve can be used, because almost the duration of an engine cycle is available for the opening of this valve.

Figure 4:
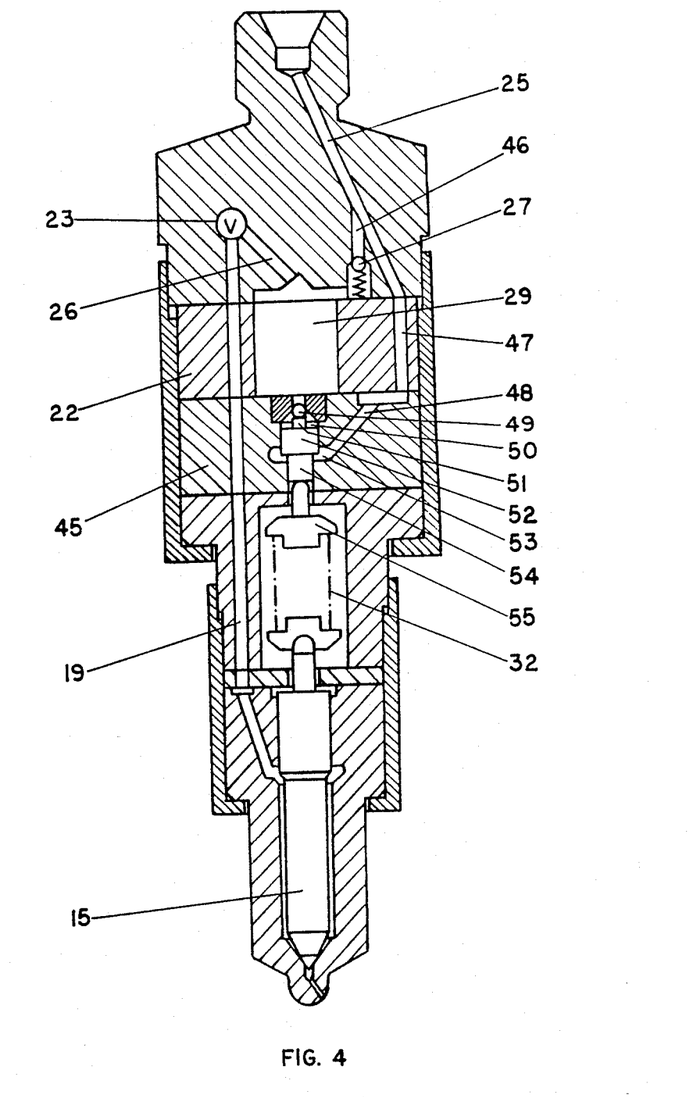
FIG. 4 represents an embodiment of the injector of the ignition chamber provided with a valve which controls the fuel pressure in the accumulator.

The drain of a portion of the accumulated fuel can be achieved by providing the injector of the ignition chamber with a pressure control valve, as shown in FIG. 4 wherein, as an example, a hydro-mechanical pressure control valve was considered. The injector has all the components of the injector of FIG. 2. Additionally the injector of FIG. 4 includes barrel 45 in which the pressure control valve 49 is located. This valve is actuated by the spring 32 of the nozzle needle 15. The spring force is transmitted by the spring support 55, which acts on pistons 54 and 52 forming together one piece, and by the cylindrical portion 51 of piston 52. Chamber 53 is connected to high pressure channel 25 via channels 48 and 47. Chamber 50 is drained by a channel which is not represented in FIG. 4. The accumulator 29 is directly connected to pressure control valve 49. The one-way check valve 27 in connected to high pressure channel 25 via channel 46. The drain 30 (FIGS. 2 and 3) has not been represented in FIG. 4.

The accumulation of the fuel charge of ignition chamber 6 occurs as described in connection with FIG. 2. During the injection of the fuel charge of open chamber 3 (FIG. 1) valve 49 remains closed whichever is the pressure in the accumulator 29, because the fuel pressure in chamber 53 is equal to fuel pressure in high pressure channel 25. Consequently the pressure control valve 49 is maintained on its seat by the force of spring 32, as well as by the force generated on piston 52 by the fuel pressure in chamber 53. After the end of injection in open chamber 3 the pressure in high pressure channel 25 as well as in chamber 53 decreases to the residual pressure in high pressure line 10 (FIG. 1). Valve 49 opens and a portion of the fuel of the accumulator 29 is drained via chamber 50. This portion depends on the residual pressure in chamber 53, therefore on load and speed; the higher the load and speed, the higher the residual pressure, and consequently the smaller the discharge of the accumulator.

Thus, the injector of FIG. 4 achieves a fuel charge of ignition chamber 6 whose size increases with load and speed, as the injectors of FIGS. 2 and 3 do. However, the increase of the fuel charge is attenuated by the partial discharge of the accumulator 29 achieved by the pressure control valve 49. The attenuation can be controlled by a corresponding selection of the diameters of pistons 54 and 52, and the diameter of the channel controlled by the valve 49.

The operation of pressure control valve 49 avoids any interference between the discharge of the accumulator 29 and the injection of the fuel charge of open chamber 3, because the discharge occurs after the end of fuel injection into open chamber 3. The dynamics of the discharge does not have an impact on the fuel injection into ignition chamber 6 in the next cycle, due to relatively long period of time available for the discharge. This period of time extends from the end of fuel injection into open chamber 3, to the next opening of the electromagnetic valve 23. Consequently there is enough time to complete the discharge before the start of the injection into ignition chamber 6.

The injector of FIG. 4 delivers a constant amount of fuel into ignition chamber 6 if the high pressure line 10 (FIG. 1) is connected to the fuel tank 12 between consecutive injections into open chamber. In this case the residual pressure in line 10 is the same at any operating regime of the engine. Therefore the pressure in the accumulator 29 at the end of the discharge into chamber 50 is always the same, because this pressure depends only on the force of spring 32, and on the diameter of the channel controlled by the valve 49. Thus, the injector delivers a constant amount of fuel at any operating regime. For a given spring 32, the size of the fuel charge of ignition chamber 6 can be tailored by selecting the volume of the accumulator 29 and the diameter of the channel controlled by the valve 49.

The connection of high pressure section of the injection system to the fuel tank 12 can be achieved through a derivation controlled by a valve whose operation is electronically programmed, or through and controlled by the injection pump. The connection through a derivation allows the operation of the injector of FIG. 4 with a constant or variable fuel charge of the ignition chamber 6 (FIG. 1), as the high pressure section of the injection system is/is not connected to the fuel tank 12 between consecutive injections into open chamber 3, respectively.

The pressure control valve 49 of FIG. 4 can also be used in the embodiment of FIG. 3.

Figure 5:
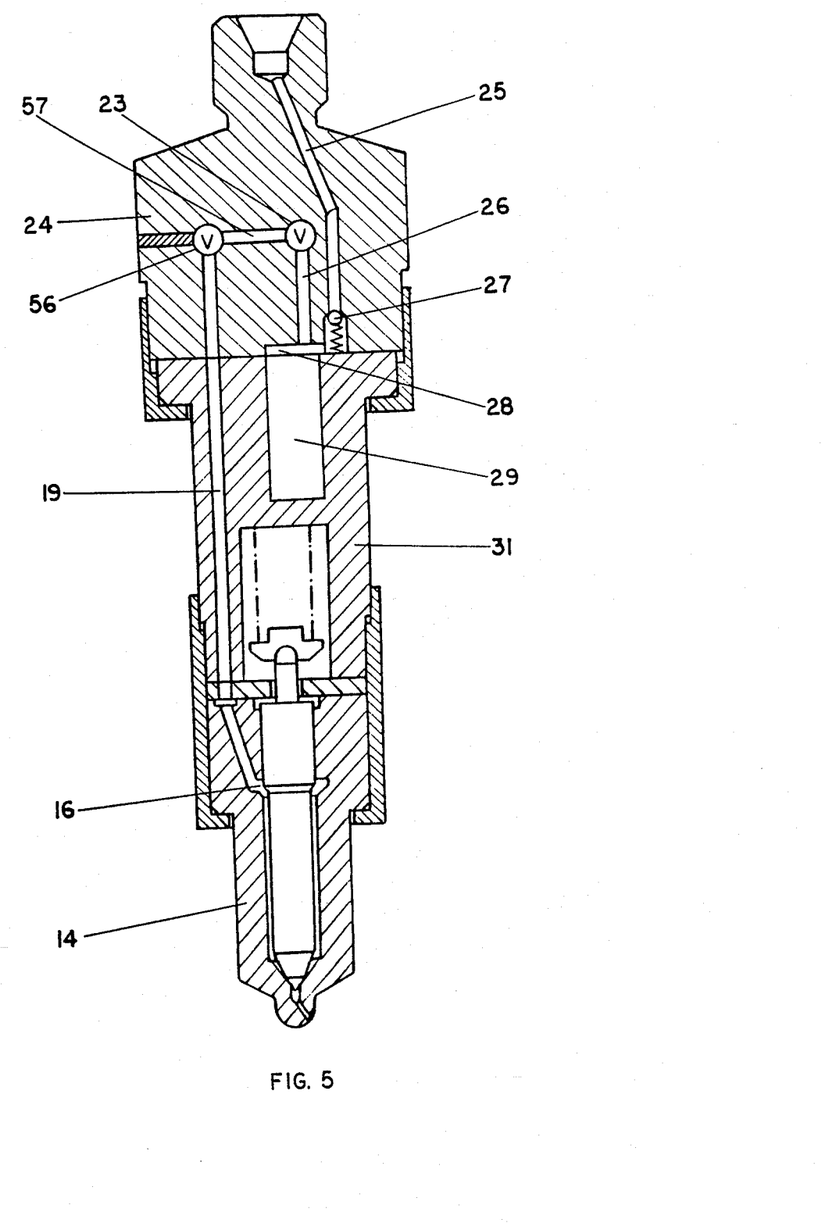
FIG. 5 represents an embodiment of the injector of the ignition chamber including two 2-way electromagnetic valves located on the connection between the accumulator and the nozzle.

The partial discharge of the accumulator towards the nozzle can be achieved by providing an additional control on the connection between the accumulator 29 and nozzle 14, as shown in FIG. 5, wherein the additional control includes, as an example, a 2-way electromagnetic valve.

The injector of FIG. 5 has the components of the injector of FIG. 2. As a variant the accumulator 29 is located in housing 31 which allows the elimination of barrel 22 (FIG. 2). The injector includes a 2-way electromagnetic valve 57 which controls a connection between the accumulator 29 and the electromagnetic valve 23, achieved via channels 28, 58, and 56. Before the start of injection in the ignition chamber 6, valve 23 is closed and valve 57 is open. To start the discharge of the accumulator 29 towards nozzle 14, valve 23 is opened. To end the discharge of the accumulator 29 towards nozzle 14, valve 57 closed. The earlier the closing of the electromagnetic valve 57, the smaller the discharge of the accumulator, and therefore the smaller the amount of fuel injected in the ignition chamber 6. The fuel charge of ignition chamber 6 can be tailored by a corresponding selection of the closing timing of the electromagnetic valve 56.

The injector of FIG. 5 can operate as described by using slow acting electromagnetic valves 23 and 56, because almost an entire engine cycle is available for switching the valves back in the initial positions.

To prevent a premature discharge of the accumulator 29 towards nozzle chamber 16, first valve 23 is closed, and then valve 56 is opened.

In the injectors of FIGS. 2–5 the channels have been represented with their axes situated in the same plane, for description purpose. Actually the channels shall be located around the injector axis for decreasing the size of the injector.

To optimize the engine operation over the speed and load range, as well as according to the characteristics of the used fuels, the electromagnetic valves of the embodiments of FIGS. 2–5 are electronically programmed.

The internal combustion engine according to the invention has significant advantages.

The engine has a broad fuel tolerance due to its new combustion system, and to the high flexibility of fuel injection into the ignition chamber, which ensure the engine insensitivity to fuel volatility, viscosity, self-ignition property, and knock resistance.

The engine has improved efficiency because of the low variation of the specific fuel consumption over the load and spped range. This fact is mostly due to the fast fuel vaporization and improved fuel-air mixing in open chamber, achieved by the burning gases ejected from the ignition chamber. These effects are less dependent on load and speed.

At low load and idle the engine can be operated with combustion in the ignition chamber only. For this purpose the injector of the ignition chamber is designed to open at a lower fuel pressure than the injector of open chamber. Consequently, at low load and idle fuel injection is achieved in the ignition chamber only. Because combustion in this chamber occurs in near homogeneous fuel-air mixture, the engine efficiency is also improved in the low load range.

The smooth combustion in open chamber reduces substantially the combustion noise, and improves the mechanical efficiency. The engine has an easy cold start because the combustion starts in the ignition chamber by spark ignition and not by self-ignition. The manufacturing of the engine does not require new technologies of factory retooling.

The foregoing specification of the invention has been referred to some configurations and methods of operation, it being understood that many other configurations and methods of operation are possible within the essence and the scope of the invention.

I claim:

1. An internal combustion engine including at least one cylinder, each cylinder being provided with an open combustion chamber connected by a channel with a separate combustion chamber called ignition chamber, each combustion chamber being provided with its own injector, each injector including a high pressure channel through which fuel penetrates into injector, a nozzle provided with a valve which opens and closes the delivery channel of the nozzle, said nozzle valve being actuated by the nozzle spring, the injector including also a drain, said ignition chamber, which is low cooled or insulated, being provided with a spark plug connected to a spark ignition system and with a glow plug connected to a source of electricity, the fuel charge of each combustion chamber being heated by means prior to its injection, the internal combustion engine including as injection pump connected to a fuel tank, said internal combustion engine being characterized by the capacity to operate with a broad variety of fuels, this capacity being achieved by connecting the injectors of the two combustion chambers to said injection pump, and by injecting the fuel charge of the two combustion chambers at different moments of the engine cycle, starting with the fuel charge of the ignition chamber, the two sequential injections being accomplished by the same injection pump through the accumulation of the fuel charge of the ignition chamber in the injector of this chamber during the fuel injection into the open chamber, the accumulated fuel being injected during the next engine cycle into the ignition chamber at selected timing and in controllable amount, where it vaporizes, mixes with air, and then the fuel-air mixture is spark ignited, the fuel charge of the open chamber being injected at selected timing and in controllable amount into the burning gases ejected from the ignition chamber, the accumulation, injection, and the control of the fuel charge of the ignition chamber being achieved by providing the injector of this chamber with means including an accumulator connected with the high pressure channel and with the nozzle,
means which prevents the discharge of the accumulator into high pressure channel,
means which control the timing of the discharge of the accumulator towards the nozzle,
means which control the amount of fuel injected into the ignition chamber.

2. An internal combustion engine as defined in claim 1, characterized in that said means which prevents the discharge of the accumulator into high pressure channel include a one-way check valve.

3. An internal combustion engine as defined in claim 2, characterized in that said means which control the timing of the discharge of the accumulator towards the nozzle include a 2-way electromagnetic valve electronically programmed, located on the connection between the accumulator and the nozzle.

4. An internal combustion engine as defined in claim 3, characterized in that said means which control the amount of fuel injected into the ignition chamber include a 2-way electromagnetic valve electronically programmed, located on the connection between the accumulator and high pressure channel, upstream from the one-way check valve which prevents the discharge of the accumulator into high pressure channel.

5. An internal combustion engine as defined in claim 3, characterized in that said means which control the amount of fuel injected into the ignition chamber include a pressure control valve which controls a connection between the accumulator and said drain, said pressure control valve being actuated by the nozzle spring whose force acts in the sense of valve closing, said pressure control valve including a chamber in open connection with high pressure channel of the injector, the force generated on the valve by the fuel pressure in said chamber acting in the sense of valve closing, said pressure control valve being designed to remain closed during the fuel injection in the ignition chamber as well as in open chamber, and to open after the fuel injection in open chamber, when the fuel pressure in high pressure channel has decreased, which allows the partial discharge of the accumulator into said drain.

6. An internal combustion engine as defined in claim 5, characterized in that the connection between the injection pump and the injectors of the ignition chamber and open chamber is connected to the fuel tank between consecutive injections into open chamber for a selected period of time, the connection to the fuel tank being controlled by a valve whose operation is electronically programmed.

7. An internal combustion engine as defined in claim 5, characterized in that the connection between the injection pump and the injectors of the ignition chamber and open chamber is connected to the fuel tank between consecutive injections into open chamber, the connection to the fuel tank being achieved through and controlled by the injection pump.

8. An internal combustion engine as defined in claim 3, characterized in that said means which control the fuel charge of the ignition chamber include a 2-way electromagnetic valve electronically programmed, located on the connection between the accumulator and the nozzle, downstream from the 2-way electromagnetic valve which controls the timing of the discharge of the accumulator towards the nozzle.

9. An internal combustion engine as defined in claim 2, characterized in that said means which control the timing of the discharge of the accumulator towards the nozzle include a valve, called accumulator discharge valve, said accumulator discharge valve including a chamber connected to high pressure channel by a channel provided with a one-way check valve, as well as by a control channel provided with a 2-way electromagnetic valve, the accumulator discharge valve being closed by the pressure of the fuel trapped in the valve chamber during the period of time wherein the injection pump delivers fuel towards the two injectors, and opened by the pressure of the fuel existing in the connection between the accumulator and the nozzle, when the 2-way electromagnetic valve opens the connection between the chamber of the accumulator discharge valve and high pressure channel, said 2-way electromagnetic valve being electronically programmed.

10. An internal combustion engine as defined in claim 9, characterized in that said means which control the amount of fuel injected into the ignition chamber include a 2-way electromagnetic valve electronically programmed, located on the connection between the accumulator and high pressure channel, upstream from the one-way check valve which prevents the discharge of the accumulator into high pressure channel.

11. An internal combustion engine as defined in claim 9, characterized in that said means which control the amount of fuel injected into the ignition chamber include a pressure control valve which controls a connection between the accumulator and said drain, said pressure control valve being actuated by the nozzle spring whose force acts in the sense of valve closing, said pressure control valve including a chamber in open connection with high pressure channel of the injector, the force generated on the valve by the fuel pressure in said chamber acting in the sense of valve closing, said pressure control valve being designed to remain closed during the fuel injection in the ignition chamber as well as in open chamber, and to open after the fuel injection in open chamber, when the fuel pressure in high pressure channel has decreased, which allows the partial discharge of the accumulator into said drain.

12. An internal combustion engine as defined in claim 11, characterized in that the connection between the injection pump and the injectors of the ignition chamber and open chamber is connected to the fuel tank between consecutive injections into open chamber for a selected period of time, the connection to the fuel tank being controlled by a valve whose operation is electronically programmed.

13. An internal combustion engine as defined in claim 11, characterized in that the connection between the injection pump and the injectors of the ignition chamber and open chamber is connected to the fuel tank between consecutive injections into open chamber, the connection to the fuel tank being achieved through and controlled by the injection pump.

14. An internal combustion engine as defined in claim 4, characterized in that the opening pressure of the two injectors is so selected that at low load and idle the injector of the open chamber remains closed, the entire fuel charge for the respective regimes being injected into the ignition chamber.

15. An internal combustion engine as defined in claim 14, characterized in that the spark plug and the glow plug of the ignition chamber are assembled in one part.

16. An internal combustion engine as defined in claim 5, characterized in that the opening pressure of the two injectors is so selected that at low load and idle the injector of the open chamber remains closed, the entire fuel charge for the respective regimes being injected into the ignition chamber.

17. An internal combustion engine as defined in claim 16, characterized in that the spark plug and the glow plug of the ignition chamber are assembled in one part.

18. An internal combustion engine as defined in claim 6, characterized in that the opening pressure of the two injectors is so selected that at low load and idle the injector of the open chamber remains closed, the entire fuel charge for the respective regimes being injected into the ignition chamber.

19. An internal combustion engine as defined in claim 18, characterized in that the spark plug and the glow plug of the ignition chamber are assembled in one part.

20. An internal combustion engine as defined in claim 7, characterized in that the opening pressure of the two injectors is so selected that at low load and idle the injector of the open chamber remains closed, the entire fuel charge for the respective regimes being injected into the ignition chamber.

21. An internal combustion engine as defined in claim 20, characterized in that the spark plug and the glow plug of the ignition chamber are assembled in one part.

22. An internal combustion engine as defined in claim 8, characterized in that the opening pressure of the two injectors is so selected that at low load and idle the injector of the open chamber remains closed, the entire fuel charge for the respective regimes being injected into the ignition chamber.

23. An internal combustion engine as defined in claim 22, characterized in that the spark plug and the glow plug of the ignition chamber are assembled in one part.

24. An internal combustion engine as defined in claim 10, characterized in that the opening pressure of the two injectors is so selected that at low load and idle the injector of the open chamber remains closed, the entire fuel charge for the respective regimes being injected into the ignition chamber.

25. An internal combustion engine as defined in claim 24, characterized in that the spark plug and the glow plug of the ignition chamber are assembled in one part.

26. An internal combustion engine as defined in claim 11, characterized in that the opening pressure of the two injectors is so selected that at low load and idle the injector of the open chamber remains closed, the entire fuel charge for the respective regimes being injected into the ignition chamber.

27. An internal combustion engine as defined in claim 26, characterized in that the spark plug and the glow plug of the ignition chamber are assembled in one part.

28. An internal combustion engine as defined in claim 12, characterized in that the opening pressure of the two injectors is so selected that at low load and idle the injector of the open chamber remains closed, the entire fuel charge for the respective regimes being injected into the ignition chamber.

29. An internal combustion engine as defined in claim 28, characterized in that the spark plug and the glow plug of the ignition chamber are assembled in one part.

30. An internal combustion engine as defined in claim 13, characterized in that the opening pressure of the two injectors is so selected that at low load and idle the injector of the open chamber remains closed, the entire fuel charge for the respective regimes being injected into the ignition chamber.

31. An internal combustion engine as defined in claim 30, characterized in that the spark plug and the glow plug of the ignition chamber are assembled in one part.

* * * * *